Aug. 14, 1962  R. G. D'ASCOLI  3,049,584
HIGH VOLTAGE SHIELDING COMPOSITION
Filed Feb. 10, 1959
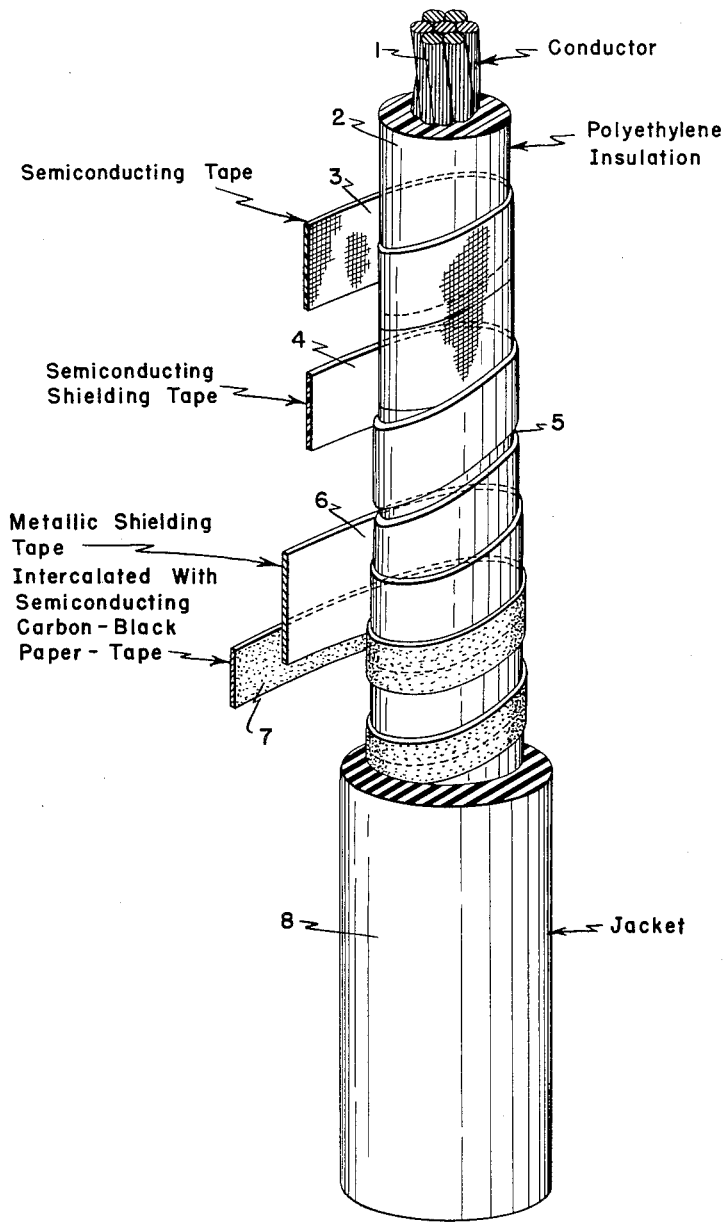
INVENTOR
Ralph G. D'Ascoli
BY
ATTORNEYS 3,049,584
HIGH VOLTAGE SHIELDING COMPOSITION
Ralph Gregory D'Ascoli, Yonkers, N.Y., assignor to Anaconda Wire and Cable Company, a corporation of Delaware
Filed Feb. 10, 1959, Ser. No. 792,309
5 Claims. (Cl. 174—120)

This invention relates to shielding compositions and, more particularly, to semiconducting compositions which are suitable for use in shielding high voltage power cables and similar electrical apparatus. The invention provides an improved semiconducting tape which possesses both a low resistivity transversely through it as well as notable resistance to ozone, and which is particularly suitable for being wrapped about high voltage electric power cables, especially those insulated with polyethylene, for shielding purposes. The invention further provides an improved shielded electric power cable which may be operated at high voltages and over sustained periods of time without danger of oxidative or ozonolytic degradation to the shielding material.

It is common practice to surround the insulation of high voltage power cables and similar electrical apparatus with an electrostatic shield maintained at ground potential. The purpose of the shield is to assure maintaining a uniform potential at the interface of the cable insulation and the surrounding dielectric (e.g. a jacket, or the atmosphere), so that electrical stress to which the insulation is subjected will be maintained substantially uniform. Often the shield is made up of a metallic structure, such as thin metal tapes wrapped helically over the surface of the insulation of a power cable; but sometimes the nature of the structure precludes using a metallic shield. For example, a power cable insulated with polyethylene cannot be securely shielded with metallic tapes because of the great extent to which polyethylene expands and contracts with the changes in temperature to which the cable is subjected. In such cases it is customary to use a shield comprising an elastomeric material rendered semiconducting by being heavily loaded with a conducting filler such as carbon black, graphite, or even metal powder.

Semiconducting tapes heretofore used for electrostatic shielding of power cables have shown some tendency to become brittle and to crack, though the elastomers of which they are composed are generally polymers which are quite highly saturated. I have found that despite their low content of unsaturated bonds, cracking of these elastomers is generally due to ozonolytic attack. For example, a composite mixture of elastomers consisting essentially of a chlorosulfonated polyethylene and butyl rubber (a copolymer of isobutylene and a small proportion of a diene), both of which normally are resistant to ozone, undergoes degradation when compounded into a semiconductive shielding medium and used after curing to shield high voltage electric power cables. I have found that by incorporating a small amount of an antiozidant in this composite polymer system prior to curing, it is possible to effect a marked improvement in the resistance of the polymer system to cracking when the resultant semiconductive composition is employed as a shield for power cables operated at high voltages.

The invention therefore provides an improved ozone-resistant, elastically resilient, electrically conducting composition which may be used to shield any high voltage electrical apparatus, particularly high voltage electric power cables, and which comprises a substantially saturated, normally ozone-resistant elastomer through which a finely divided electrical conductor is dispersed in an amount sufficient to impart high-resistance electrical conductivity thereto, and with which a small quantity of an antiozidant has been blended. A preferred composition of this character comprises the cured product of a composite elastomeric mixture containing a chloro-sulfonated polyethylene, a copolymer of isobutylene and a small proportion of a diene, a finely divided electrical conductor dispersed throughout the elastomeric mixture in an amount sufficient to impart the characteristics of a high-resistance conductor to the composition, and a small amount of an antiozidant.

Any antiozidant or compound that is preferentially attacked by ozone may be employed in a shielding composition in accordance with the invention. Particularly satisfactory results have been obtained by using N,N'-dialkyl-p-phenylenediamine antiozidants in which the N-alkyl substituents contain at least eight carbon atoms, of which N,N'-di-3-(5-methylheptyl)-p-phenylenediamine and N,N'-di-2-octyl-p-phenylenediamine are but two representative compounds. Although antiozidants may be employed over a very wide range of concentrations, they are preferably used in an amount in the range from about 0.1 to about 3 percent by weight of the insulating composition. A particularly satisfactory range for above-identified antiozidants is from 0.5 to 2 percent by weight.

I have further found that inclusion of a small proportion of a wax in the elastomer composition notably enhances the effectiveness of the antiozidant, and it further produces the surprising effect of increasing the conductivity of the composition in the direction normal to that in which it is rolled during milling. In particular, tapes made from semiconducting elastomeric compositions in which wax is included are notably more conductive in the direction through their thickness, and so make possible the production of cables having a much greater conductivity in the radial direction through the shield tapes than is possible with similar compositions containing no wax.

The invention therefore further provides an improved elastically resilient, electrically conducting composition which may be used for shielding high voltage electrical apparatus, particularly high voltage power cables, comprising an elastomeric polymer through which a finely divided electrical conductor is dispersed in an amount sufficient to impart high-resistance electrical conductivity thereto, and with which a small quantity of a wax has been blended.

Any desired type of wax may be employed, but particularly satisfactory results are achieved with the use of paraffinic and microcrystalline waxes. The wax generally is employed in an amount ranging from about 0.5 to about 5 percent by weight of the composition. Significantly, when a wax is employed in the shielding composition, the amount of antiozidant required to obtain a given ozone resistance is generally about 40 percent less than that required when no wax is used.

The antiozidant and wax preferably are incorporated, prior to curing, in a shielding composition which contains three major components, namely, chlorosulfonated polyethylene, butyl rubber, and a finely divided electrical conductor, and which generally contains in addition minor amounts of various other additives such as plasticizers, antioxidants, curing and accelerating agents, such as are normally employed in rubber compounding. Typical shielding compositions are usually composed of from 30 to 65 percent by weight of butyl rubber (a copolymer of isobutylene and a small proportion of a diene) or other type of rubber which has high chemical stability and, preferably, a low degree of unsaturation, from about 5 to about 30 percent by weight of chlorosulfonated polyethylene, and from about 30 to about 65 percent by weight of a finely divided electrical conductor, such as carbon black, graphite, or metal powder, the amount of the electrical conductor being sufficient to give the shielding composition the characteristics of a high-resistance conductor. In addition to these three major components, the typical shielding composition also contains one or more of the various other minor additives normally employed in rubber compounding, such as stearic acid, zinc oxide, lubricating oils, antioxidants (e.g. phenyl-β-naphthylamine), as well as various vulcanizing agents (e.g. sulfur), and accelerators (e.g. tellurium diethyldithiocarbamate), the total amount of all of these minor additives generally ranging up to about 15 percent by weight of the composition.

To prepare shielding tapes of this preferred composition, a mixture of the butyl (or other) rubber, chlorosulfonated polyethylene, carbon black (or other finely divided electrical conductor), antiozidant, and wax, together with the requisite vulcanizing and curing additives, is milled on conventional roll mills until all of the ingredients are thoroughly blended. It is then rolled into sheets, vulcanized or cured (the terms being synonymous and interchangeable) at a temperature of about 140° C. to about 160° C. and at a pressure between 400 and 600 pounds per square inch, and then cut into sheets of the desired width. The cured product, which is elastically resilient, is eminently suitable for shielding high voltage electric power cables.

The single FIGURE of the accompanying drawing shows a power cable incorporating shielding tapes in accordance with the invention.

The cable shown in the drawing is a single conductor cable having a central stranded conductor 1 surrounded by a relatively thick insulated layer 2 of polyethylene. In order to equalize electrical stresses at the surface of the polyethylene insulation, a thin cloth tape 3, which is rendered electrically conductive by being impregnated with carbon or other finely divided electrical conducting material, is wrapped helically about the insulation. The cloth tape 3 is, of course, very flexible and is itself capable of yielding to such thermal expansion of the polyethylene as occurs during normal use of the cable. The layer of cloth tape 3, however, is not an essential part of the cable of this invention, and in some cable constructions according to the invention it may be omitted altogether.

Next is applied a relatively thick cushioning layer in the form of a helically wrapped shielding tape 4 of the improved ozone-resistant, elastically resilient, electrically conducting composition of the invention. The tape is preferably applied helically, as shown, with its edges spaced apart slightly to form a helical gap 5 extending the length of the cable. Alternatively, the shielding tape 4 may be applied with its edges overlapping, and in such case a gap which extends helically the length of the cable is formed in the region of the overlap.

The shielding tape 4 consists of the cured product of a composite elastomeric mixture containing a chlorosulfonated polyethylene, butyl rubber (a copolymer of isobutylene and a small proportion of a diene), a finely divided electrical conductor dispersed throughout the elastomeric mixture in an amount sufficient to impart the characteristics of a high-resistance conductor to the tape, from about 0.5 to about 5 percent by weight of a paraffinic wax, and from about 0.5 to about 2 percent by weight of an N,N'-dialkyl-p-phenylenediamine antiozidant in which the N-alkyl substituents contain at least eight carbon atoms. By using this composition to make the shielding tape 4, and particularly when such tape is used in combination with the layer 3 of electrically conductive material closely surrounding the surface of the polyethylene insulation, it is possible to substantially eliminate the development of small zones subjected to high electrical stress in the cable structure beyond the polyethylene insulation.

Helically wrapped about the shielding tape 4 is a metallic shield tape 6 which, as shown in the drawing, is advantageously intercalated with a paper tape 7 impregnated with sufficient carbon black or equivalent material to render it electrically conductive. However, it is not an essential feature of the invention that the paper 7 be employed, nor is it essential, when it is employed, that it be in the form of a separate tape intercalated with the metallic shield tape 6.

The cable is completed by protective jacket 8, which may be of an insulating material such as a rubber composition or polyvinyl chloride, or which may be of a shielding material, such as a lead sheath or a steel armor. In normal use, the polyethylene insulation of the cable structure which is described above is subjected to heating and cooling in conformity with variations that occur in the amount of current carried by the conductor 1, as well as with changes in the ambient temperature. Expansion of the polyethylene which occurs with an increase in its temperature is considerably greater than the accompanying thermal expansion of the metallic shield tape 6. However, the expansion of the polyethylene is accommodated by the ozone-resistant, elastically resilient shielding tape 4 which deforms sufficiently for such purpose without imposing excessive tensile force or hoop stress on the metallic shield. Consequently, the electric power cable of the invention may be operated at high voltages and over sustained periods of time without danger of oxidative or ozonolytic degradation to the shielding material.

To further illustrate the applicability of incorporating an antiozidant, with or without wax, in a semiconductive polymer system comprising chlorosulfonated polyethylene and butyl rubber in accordance with the invention, Table I lists the compositions of three shielding tapes which were employed in carrying out the examples set forth below. Each of these tapes was formed by milling the respective components in conventional rubber milling equipment until all of the ingredients were thoroughly blended. The milled product, in thin sheet form, was cured at a temperature between 140° C. and 150° C. and at pressures between 400 and 600 pounds per square inch to form elastically resilient tapes, and then was cut into strips of the desired width. One of the thus-produced tapes contained neither an antiozidant nor wax. Of the remaining two tapes, one contained 2.0 parts by weight of an antiozidant, namely N,N'-di-3-(5-methylheptyl)-p-phenylenediamine, while the other contained both the antiozidant (1:2 parts by weight) and a microcrystalline wax.

TABLE I

*Compositions of Semiconductive Shielding Tapes*

| Component | Tape 1 | Tape 2 | Tape 3 |
|---|---|---|---|
| Butyl rubber | 90 | 90 | 90 |
| Chlorosulfonated polyethylene | 10 | 10 | 10 |
| Carbon black | 80 | 80 | 80 |
| Sulfur | 2.5 | 2.5 | 2.5 |
| Zinc oxide | 5.0 | 5.0 | 5.0 |
| Stearic acid | 1.0 | 1.0 | 1.0 |
| Phenyl-α-naphthylamine | 2.0 | 2.0 | 2.0 |
| Light hydrocarbon oil | 6.0 | 6.0 | 6.0 |
| Tellurium diethyldithiocarbamate | 1.5 | 1.5 | 1.5 |
| N,N'-di-3-(5-methylheptyl)-p-phenylenediamine | -------- | 2.0 | 1.2 |
| Microcrystalline wax | -------- | -------- | 4.8 |

Table II summarizes the physical properties and ozone resistance of each of the shielding tapes described in Table I. To determine the ozone resistance, each tape was helically wrapped around a polyethylene-insulated cable having an outer diameter of 1.2 inches, applying the same tension in each case, and the shielded cable bent into a U-shape having a radius of 15 inches. Each sample was then enclosed in a constant-temperature oven through which a stream of air laden with ozone was continuously circulated, the ozone being constantly renewed by circulating the air from the oven through an ozone generator and then back to the oven. Each sample was held for the indicated length of time at 60° C., then (if it had not failed by showing brittleness and cracking) it was heated to 70° C. and held at such temperature either until it failed or until elapse of the stated period of time, then it was heated to 80° C. and held at such temperature for the indicated period or until failure, and then (if it had not failed) was heated at 90° C. for the indicated period of time. The number of hours each sample could withstand this treatment before cracking was taken as representing the ozone resistance of that sample.

TABLE II

*Physical Properties and Ozone Resistance of Shielding Tapes*

| Tape No. | Physical Properties | | | Ozone Resistance—Hours in Ozone at Indicated Temperature Before Cracking | | | |
|---|---|---|---|---|---|---|---|
| | Tensile Strength (lbs. sq. in.) | Modulus at 200% (lbs./sq. in.) | Elongation (percent) | 60° C. | 70° C. | 80° C. | 90° C. |
| 1 | 1,550 | 875 | 340 | 8 | | | |
| 2 | 2,450 | 1,165 | 360 | 48 | 40 | 40 | 8 |
| 3 | 1,585 | 725 | 412 | 40 | 40 | 40 | 104 |

A comparison of the experimental results tabulated in Table II demonstrates that the use of the antiozidant in the tape results in a marked increase in its ozone resistance and, moreover, that this resistance to ozone is still further increased by employing the antiozidant in conjunction with a small amount of wax.

In addition to further increasing the ozone resistance of shielding tapes which contain an antiozidant, the use of wax in the tape decreases its radial resistivity. In all probability it does so by facilitating in some manner the internal alignment of the conductive carbon black particles dispersed throughout the tape, but whatever the mechanism it thereby increases the overall effectiveness of the insulating composition as a shielding medium. As a general rule, I have found that the higher the concentration of the electrical conductor in the tape, the more pronounced will be the decrease in radial resistivity upon the addition of wax to the composition. To demonstrate this principle, Table III sets forth the longitudinal (axial) and radial resistivities of the three shielding tapes described in Table I. The radial resistivity in each case was measured on a Wheatstone bridge, while the longitudinal resistivities of each sample were determined on a four-terminal cell, comparing the voltage drop across each tape with that across a standard one-megohm resistor.

TABLE III

*Resistivity Measurements*

| Tape No. | Resistivity (ohm-inches) | |
|---|---|---|
| | Axial | Radial |
| 1 (no wax) | 131.0 | 38,200 |
| 2 (no wax) | 10.4 | 15,600 |
| 3 (contains wax) | 31.0 | 1,150 |

Although the foregoing examples of the invention demonstrate the marked advantage in incorporating an N,N'-dialkyl-p-phenylenediamine antiozidant in which the N-alkyl substituents contain at least eight carbon atoms in a semiconductive polymer system consisting essentially of chlorosulfonated polyethylene and butyl rubber, similar advantages are also obtained when other antiozidants are employed in the shielding composition, particularly in conjunction with a small quantity of wax.

I claim:

1. An ozone-resistant, elastically resilient, electrically conductive composition suitable for use in shielding high-voltage electric power cables comprising the cured product of a composite elastomeric mixture containing from about 5 to about 30 percent by weight of a chlorosulfonated polyethylene, from about 30 to about 65 percent by weight of a copolymer of isobutylene and a small proportion of a diene, from about 30 to about 65 percent by weight of a finely divided electrical conductor dispersed throughout the elastomeric mixture to impart the characteristics of a high-resistance conductor to the cured product, and from about 0.5 to about 2 percent by weight of an N,N-dialkyl-p-phenylenediamine antiozidant in which the N-alkyl substituents contain at least eight carbon atoms.

2. An ozone-resistant, elastically resilient, electrically conductive tape suitable for use in shielding high voltage electric power cables, said tape consisting of the cured product of a composite elastomeric mixture containing from about 5 to about 30 percent by weight of a chlorosulfonated polyethylene, from about 30 to about 65 percent by weight of a copolymer of isobutylene and a small proportion of a diene, from about 30 to about 65 percent by weight of a finely divided electrical conductor dispersed throughout the elastomeric mixture to impart the characteristics of a high-resistance conductor to the tape, about 0.5 to 5 percent by weight of a wax selected from the group consisting of paraffinic and microcrystalline waxes, and 0.5 to 2 percent by weight of an N,N'-dialkyl-p-phenylenediamine antiozidant in which the N-alkyl substituents contain at least eight carbon atoms.

3. An ozone-resistant, elastically resilient, electrically conductive tape having a low radial resistivity and suitable for use in shielding high voltage electric power cables, said tape consisting of the cured product of a composite elastomeric mixture containing from about 5 to about 30 percent by weight of a chlorosulfonated polyethylene, from about 30 to about 65 percent by weight of a copolymer of isobutylene and a small proportion of a diene, from about 30 to about 65 percent by weight of a finely divided electrical conductor dispersed throughout the elastomeric mixture to impart the characteristics of a high-resistance conductor to the tape, from about 0.5 to about 5 percent by weight of a paraffinic wax, and from about 0.5 to about 2 percent by weight of an N,N'-dialkyl-p-phenylenediamine antiozidant in which the N-alkyl substituents contain at least eight carbon atoms.

4. A high voltage electric power cable comprising a metallic conductor, a layer of polyethylene insulation of substantial thickness surrounding said conductor, and an ozone-resistant, elastically resilient, electrically conductive tape wrapped helically about said insulation, said tape comprising a cured product of a composite elastomeric mixture containing from about 5 to about 30 percent by weight of a chlorosulfonated polyethylene, from about 30 to about 65 percent by weight of a rubber having a high chemical stability and a low degree of unsaturation, from about 30 to about 65 percent by weight of a finely divided electrical conductor dispersed throughout the elastomeric mixture to impart the characteristics of a high-resistance conductor to the tape, from 0.5 to 5 percent by weight of a wax selected from the group consisting of paraffinic and microcrystalline waxes, and from 0.1 to 3 percent by weight of an N,N'-dialkyl-p-phenylenediamine antiozidant in which the N-alkyl substituents contain at least eight carbon atoms.

5. A high voltage electric power cable comprising a metallic conductor, a layer of polyethylene insulation of substantial thickness surrounding said conductor, a cushioning layer comprising a helical wrapping of ozone-resistant, elastically resilient, electrically conductive rolled tape surrounding said insulation, and a thin metallic shield tape snugly applied over said cushioning layer, said electrically conductive tape consisting of the cured product of a composite elastomeric mixture containing from about 5 to about 30 percent by weight of a chlorosulfonated polyethylene, from about 30 to about 65 percent by weight of a copolymer of isobutylene and a small proportion of a diene, from about 30 to about 65 percent by weight of a finely divided electrical conductor dispersed throughout the elastomeric mixture to impart the characteristics of a high-resistance conductor to the tape, from 0.5 to 5 percent by weight of a paraffinic wax, and from 0.5 to 2 percent by weight of an N,N'-dialkyl-p-phenylenediamine antiozidant in which the N-alkyl substituents contain at least eight carbon atoms.

References Cited in the file of this patent

UNITED STATES PATENTS

| | | |
|---|---|---|
| 2,446,387 | Peterson | Aug. 3, 1948 |
| 2,729,608 | Strain | Jan. 3, 1956 |
| 2,834,828 | Ebel | May 13, 1958 |
| 2,867,604 | Rosenwald et al. | Jan. 6, 1959 |
| 2,883,362 | Rosenwald et al. | Apr. 21, 1959 |
| 2,897,177 | Tung | July 28, 1959 |
| 2,905,654 | Amgelang | Sept. 22, 1959 |